US006769173B2

(12) United States Patent
Chadbourne

(10) Patent No.: US 6,769,173 B2
(45) Date of Patent: Aug. 3, 2004

(54) ELECTRICAL CONNECTOR CRIMPING DIE

(75) Inventor: Christopher G. Chadbourne, Nashua, NH (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 09/943,013

(22) Filed: Aug. 29, 2001

(65) Prior Publication Data

US 2003/0041453 A1 Mar. 6, 2003

(51) Int. Cl.[7] ........................................ B23P 19/00

(52) U.S. Cl. ........................ 29/761; 29/751; 29/753; 29/748; 29/788; 29/796; 29/33 M; 29/857; 29/863; 29/283.5; 72/415; 72/412; 72/409.14; 72/712

(58) Field of Search ..................... 29/753, 751, 863, 29/857, 761, 283.5, 282, 865–867, 748, 749, 795, 796, 788, 33 F, 33 M; 72/415, 416, 412, 409.14, 712, 702

(56) References Cited

U.S. PATENT DOCUMENTS 3,120,772 A 2/1964 Mixon, Jr.
3,504,417 A 4/1970 Filia
3,523,351 A 8/1970 Filia
5,421,186 A 6/1995 Lefavour ..................... 72/416
6,227,030 B1 5/2001 Lefavour et al. ............. 72/416
6,230,542 B1 * 5/2001 Frenken ....................... 72/456

* cited by examiner

*Primary Examiner*—Richard Chang
(74) *Attorney, Agent, or Firm*—Harrington & Smith, LLP

(57) ABSTRACT

An electrical connector crimping die comprises a first section for removably connecting the die to an electrical connector compression tool. A second section of the die, which is connected to the first section, is provided for crimping a connector. The second section comprises a generally concave crimp projection of a given height which defines a primary crimp surface and at least one concave shaped secondary pre-crimp surface. The secondary pre-crimp surface is recessed relative to the primary crimp surface by the given height. The primary crimp surface and the secondary pre-crimp surface are arranged relative to the first section so that a major portion of a crimping force applied by the compression tool to the crimping die is applied to the primary crimp surface to crimp a first portion of the connector and so that a minor portion of the crimping force is applied to the secondary pre-crimp surface to pre-crimp a second portion of the connector. A hydraulic crimping tool employs such a crimping die. A process comprises using such a tool and die to crimp and pre-crimp an electrical connector.

20 Claims, 6 Drawing Sheets

ELECTRICAL CONNECTOR CRIMPING DIE

BACKGROUND OF THE INVENTION

1. Field of the Invention

The present invention relates to electrical connectors and, more particularly, to a die used to crimp an electrical connector onto an electrical conductor.

2. Prior Art

U.S. Pat. No. 5,291,772 discloses a compression tool ram with an electrical connector crimping surface having a pyramid shaped section and two flat sections on opposite sides of the pyramid shaped section. Examples of other compression tools and crimping dies can be found in U.S. Pat. Nos.: 3,120,772 to Mixon Jr., 3,504,417 to Filia, 3,523, 351 to Filia and 5,421,186 to Lefavour. The aforenoted patents are intended to be incorporated by reference herein in their entireties.

FCI USA, Inc. sells electrical connector crimping dies known as "W" type dies. The "W" type dies form a general circumferential crimp around a barrel section of the electrical connector. The "W" type of dies are installed primarily in what is known as an industry "D3" die retaining groove. The D3 groove is very common in mechanical hand held crimp tools such as the MD6 HYTOOL.TM. as well as hydraulic Tools such as the BAT500 BATOOL.TM. sold by FCI USA, Inc. The D3 groove can accommodate various "W" type dies and hence can crimp a multitude of conductor/connector size combinations.

U.S. Pat. No. 6,227,030, to Lefavour et al., teaches a crimp die with a positive connector stop, intended to prevent pre-crimping of connectors if a surplus of crimp force is available during the connection. Lefavour et al. also discloses a hydraulic compression tool and a crimping die removably connected to the tool. Lefavour et al. is intended to be incorporated by reference herein in its entirety.

Extruded (H-shape, C-shape, etc.) or formed sheet metal connectors are commonly known. Recently, there has been a need for these connectors to be crimped with a "W" style die, because a need has arisen for these connectors to be crimped with tools which only accept "W" style dies. These tools have a lower output force than some of their larger counterparts. Due to the lower tonnage of the tools that accept the W' style die, the width of the die surface which plows into the connector is smaller, in order to maintain the same depth of crimp as the wider dies provide with a high tonnage tool. However, using a thinner crimp surface more than once for the same connector creates problems when crimping certain connectors. This is because by crimping only small portions of the connector, the opposite end of the connector which is not supported during the crimp operation tends to bulge outward and upward, creating a surface whose flats are angled with respect to the crimp groove surface: It is therefore very difficult for the die set to grip onto the connector to make a second crimp. This problem can be resolved in accordance with this invention

SUMMARY OF THE INVENTION

In accordance with one embodiment of the invention an electrical connector crimping die comprises a first section for removably connecting the die to an electrical connector compression tool. A second section of the die, which is connected to the first section, is provided for crimping a connector. The second section comprises a generally concave crimp projection of a given height which defines a primary crimp surface and at least one concave shaped secondary pre-crimp surface. The secondary pre-crimp surface is recessed relative to the primary crimp surface by the given height. The primary crimp surface and the secondary pre-crimp surface are arranged relative to the first section so that a major portion of the crimping force applied by the compression tool to the crimping die is applied to the primary crimp surface to crimp a first portion of the connector and so that a minor portion of the crimping force is applied to the secondary pre-crimp surface to pre-crimp a second portion of the connector.

In accordance with another embodiment of the invention an electrical connector hydraulic crimping tool is provided for crimping an electrical connector onto a conductor. The crimping tool comprises a hydraulic drive section generally adapted to provide a hydraulic crimping force to an electrical connector crimping die. The connector crimping die comprises a first section for connecting the die to the drive section of the crimping tool for movement by the drive section towards a cooperating crimping die. A second section of the crimping die is connected to the first section for crimping the connector. The second section comprises a generally concave crimp projection of a given height which defines a primary crimp surface and at least one concave shaped secondary pre-crimp surface. The secondary pre-crimp surface is recessed relative to the primary crimp surface by the given height. The primary crimp surface and the secondary pre-crimp surface are arranged relative to the first section so that a major portion of a crimping force applied by the hydraulic drive section to the connector crimping die is applied to the primary crimp surface to crimp a first portion of the connector and so that a minor portion of the crimping force is applied to the secondary pre-crimp surface to pre-crimp a second portion of the connector.

In accordance with yet another embodiment of the invention a method for crimping an electrical connector onto at least two electrical conductors comprises providing a hydraulic compression crimping tool having a connector crimping die. The connector crimping die is connected to a hydraulic drive section of the crimping tool for movement by the drive section towards a cooperating crimping die. The connector crimping die has a first section for crimping the connector.

The first section comprises a generally concave crimp projection of a given height which defines a first primary crimp surface and at least one concave shaped second pre-crimp surface. The second pre-crimp surface is recessed relative to the primary crimp surface by said given height. The process further comprises compressing the crimping die against the electrical connector with the crimping projection deforming the electrical connector to provide a full crimp and the pre-crimp surface subsequently contacting the electrical connector to provide a pre-crimp.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
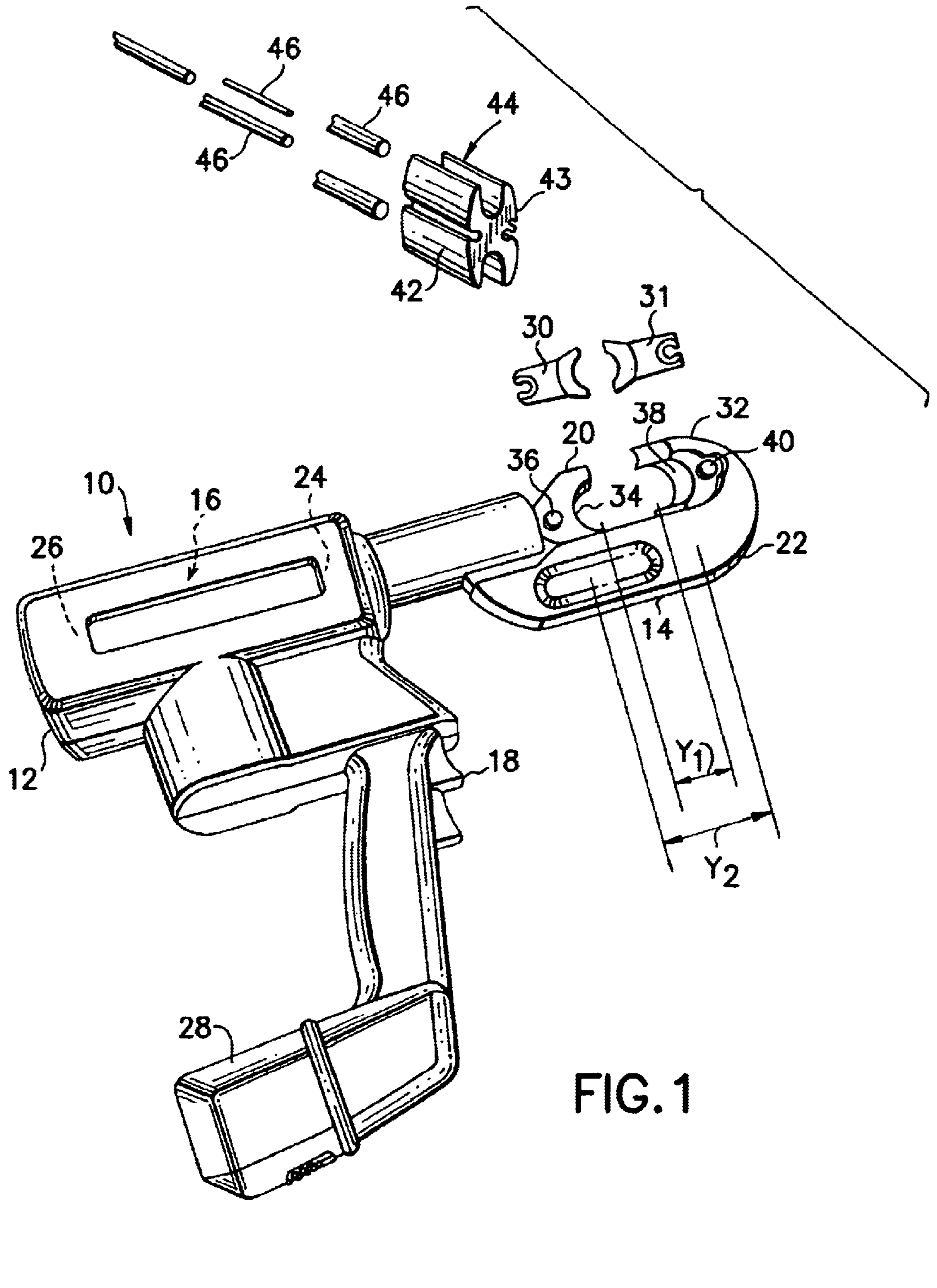
FIG. 1 is a perspective view of a hydraulic electrical connector crimping tool and a pair of crimping dies incorporating features of the present invention.
Figure 3:
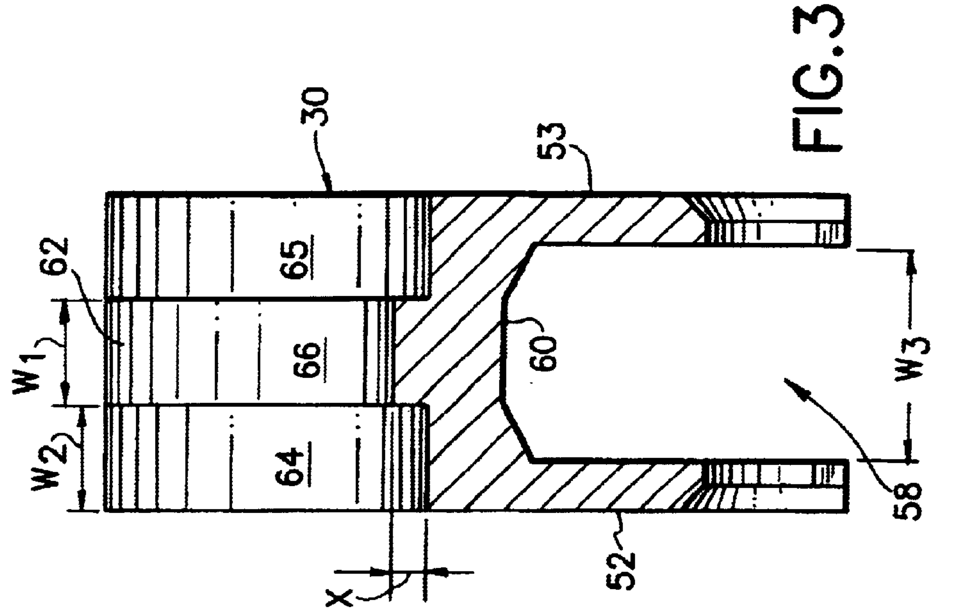
FIG. 3 is a cross-sectional view of the crimping die shown in FIG. 2C taken along line 3—3.

Although the present invention will be described with reference to the embodiments shown in the drawings, it should be understood that the present invention can be embodied in many alternate forms of embodiments. In addition, any suitable size, shape or type of elements or materials could be used.

Referring to FIG. 1, there is shown a perspective view of a hydraulic electrical connector crimping tool 10 incorporating features of the present invention. The tool 10 generally comprises a housing 12, a compression head 14, a drive system 16, and a control system 18. The compression head 14 is a well known part of crimping tools and includes a spring loaded ram 20 and a frame 22. A similar tool is disclosed in U.S. Pat. No. 5,657,417 which is hereby incorporated by reference in its entirely. Removable crimping dies 30, 31 are connected to the tool 10.

The drive system 16 generally comprises a hydraulic pressure system with a pump 24, an electric motor 26, and a battery 28. The drive system 16 is adapted to move the ram 20 towards the opposite portion 32 of frame 22 with a spring being capable of returning the ram 20 to a retracted home position when the drive system 16 is deactuated. The ram 20 includes a D3 groove 34 and a spring loaded "W" die retainer button 36. The opposite portion 32 of the frame 22 also includes a D3 groove 38 and a spring loaded "W" die retainer button 40. The ram's D3 groove 34 and retainer button 36 are generally adapted to removably mount the first die 30 to the ram 20. The frame's D3 groove 38 and retainer button 40 are generally adapted to removably mount the second die 31 to the frame 22. The tool 10 can accept any suitable type of "W" die including the new "W" type of dies 30, 31 of this invention, described in more detail below with reference to FIGS. 2A–2C and 3. The tool 10 is generally adapted to compress or crimp a barrel section 42 of an electrical connector 44 onto one or more electrical conductors 46, 46', 46". In alternate embodiments the dies 30, 31 could be used with any suitable type of connector crimping tool; not merely the tool 10 described above. Similarly, the connector 44 can be any desired connector. The invention is particularly applicable to a connector which is to be multiply crimped and which is subject to crimp deformation which would inhibit follow on crimping. The "H" style extruded connector which will be used to illustrate the invention herein is intended to be merely one example of a connector which can benefit from the die designs of this invention.

The extruded 'H' shaped connector 44 is used primarily in telecommunications connection applications. It is desirable to crimp such a connector 44 with a tool 10 which has a lower output force than other available tools, preferably, without limitation, in the range of from about 5 to about 8 tons. This lower output force tool 10 is desired by installers because it is substantially lighter in weight than other tools, and can be used in tighter spaces and in overhead applications more easily than higher tonnage/heavier tools. The lower output force tool 10, however, does not allow the standard crimp die profile to be used for these "H" style connectors.

For example, a tool with approximately 12 tons of output force would allow a crimp die of a given width to be used in order to complete the crimping of a connector 44 in one crimp. It can therefore be reasonably stated that a tool 10 with approximately 6 tons of output force (half that of the 12 ton tool), would not be able to use a crimp die with the given width, because the tool cannot compress as deeply into the connector, if it only has half the force with which to do so. Therefore, in order to compress as deeply into the connector, the lower tonnage tool would require a die with a crimp profile width which is about half the given width. However, this results in the need to use multiple crimps on the connector so that the total with of compression of the connector on the conductors is approximately equal to the given width.

Referring now also to FIGS. 2A, 2B, 2C, 3 and 4, in order to remedy this problem, the die set 30, 31 of this invention has a narrow crimp width, to allow the lower tonnage tool to adequately compress the connector 44 on one portion of its length, the die set 30, 31 also has a pre-crimping surface 64, 65, 64' which contacts the deforming uncrimped portion of the connector, during the last approximately 5–10% of the stroke/output force of the die set 30, 31 in the tool 10.

Figure 8:
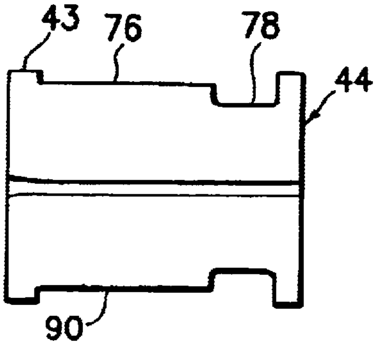
FIG. 8 is a side view; of the "H" type connector of FIGS. 5A and 5B after crimping with a single groove die using a low tonnage tool with the pre-crimping in accordance with this invention.
Figure 9:
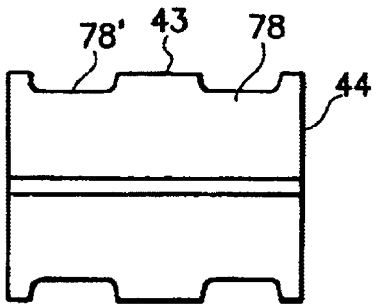
FIG. 9 is a. side view; of the "H" type connector of FIG. 8 after a second crimping with a single groove die using a low tonnage tool.

In accordance with this invention a crimp die 30, 31 is provided with a thinner primary crimping surface 66, and one or more pre-crimping surfaces 64, 65. The pre-crimp(s) provide an appropriate surface structure in the pre-crimp portions 76 (see FIG. 8) of the connector 44 for initiating a second crimping. This die design 30, 31 gives the user the option of using a crimp tool 10 with a lower output force, which still provides an adequate compression connection. This die design 30, 31 can also be used in higher tonnage tools, if desired.

The two dies 30, 31 are substantially identical and, thus, only one will be described. However, in alternate embodiments the two dies 30, 31 could be different. The dies each generally comprise a first section 48 and a second section 50. The first section 48 is generally provided for removably connecting the die 30, 31 to one of the D3 grooves 34, 38 and retainer buttons 36, 40 and has a conventional "W" type die shape for this purpose. More specifically, the first section 48 generally comprises two spaced legs 52, 53. Each leg 52, 53 comprises a button receiving area 54 and a lead-in 56. The two legs 52, 53 extending from a rear end of the second section 50 in a general cantilever fashion. The legs 52, 53 are sized and shaped to be received within a conventional D3 groove. The legs 52, 53 form a receiving area 58 therebetween for receiving a portion of the ram 20 or frame 22 and locating the received portion in the area 58 behind the second section 50; against the rear surface 60 of the second section 50. The receiving area 58 has a width $W_3$ (see FIG.

3). As an example the width $W_3$ could be about 0.5 inch, however, any suitable or desired width could be provided.

The second section 50 generally comprises a first primary crimp projection 62 and two secondary pre-crimp surfaces 64, 65. In an alternate embodiment of a suitable die 30, 31 which will be described by reference to FIG. 4, only one secondary pre-crimp surface 64' need be provided. In this embodiment, referring again to FIGS. 2A–2C and 3, the two pre-crimp surfaces 64, 65 are located on opposite sides of the crimp projection 62. The primary crimp projection 62 generally comprises a top crimp surface 66 and lateral side surfaces 68 extending generally perpendicular from the top surface 66. In an alternate embodiment the lateral side surfaces 68 could extend between the top surface 66 and pre-crimp surfaces 64, 65 at an inclined angle or be curved rather than flat surfaces. Similarly the top surface 66 in a transverse sense (e.g. transverse to the lateral side surfaces 68) could have any desired shape, by way of example, curved or pyramidal.

The primary crimp projection 62 has a width $W_1$. As an example, the width $W_1$ could be from about 0.1 to about 1 inch and more preferably from about 0.2 to about 0.5 inch. However, any suitable width or shape of the primary crimp projection 62 could be provided. The top crimp surface 66 in a longitudinal sense (e.g. parallel to the lateral side surfaces 68) is concave or curved along at least a majority of its length with a general radius of curvature $R_1$. As an example, $R_1$ could be from about 0.1 to about 0.7 inch. However, any suitable shape(s) could be provided. In addition, the top surface 66 in a longitudinal sense need not be uniformly curved or curved at all, but could have a series of angled flat surfaces, similar to sides to a polygon or any other suitable concave shape.

In this embodiment the dies 30, 31 are designed to be non-butting dies. In other words, when the tool 10 crimps the connector 44 onto the conductor 46 the two opposing dies 30, 31 do not contact each other. The dies 30, 31 are in this embodiment designed to crimp the connector 44 onto the conductor 46 without contacting each other by increasing areas of contact between the dies and the connector after a predetermined deformation of the connector has occurred and using the tool's hydraulic pressure relief system (maximum hydraulic pressure) to stop further crimping. However, if desired the dies 30, 31 could abut one another as a stop crimping arrangement. For example, the tool 10 or the dies 30, 31 could include a structural stop arrangement (not shown), which would stop further crimping as appropriate before they abut or as they abut, as the case may be.

The two pre-crimp surfaces 64, 65 are substantially the same, but could be different. Each surface 64, 65 is concave or curved along at least a majority of its length with a general radius of curvature $R_2$. In a preferred embodiment $R_2$ is about 0.2 to about 0.9 inch. However, any suitable general radius of curvature could be provided. In addition, one or both of the surfaces 64, 65 need not have a uniform curvature or be curved at all. They could comprise any suitable concave surface, such as a series of angled flats, similar to sides of a polygon.

Figure 2A:
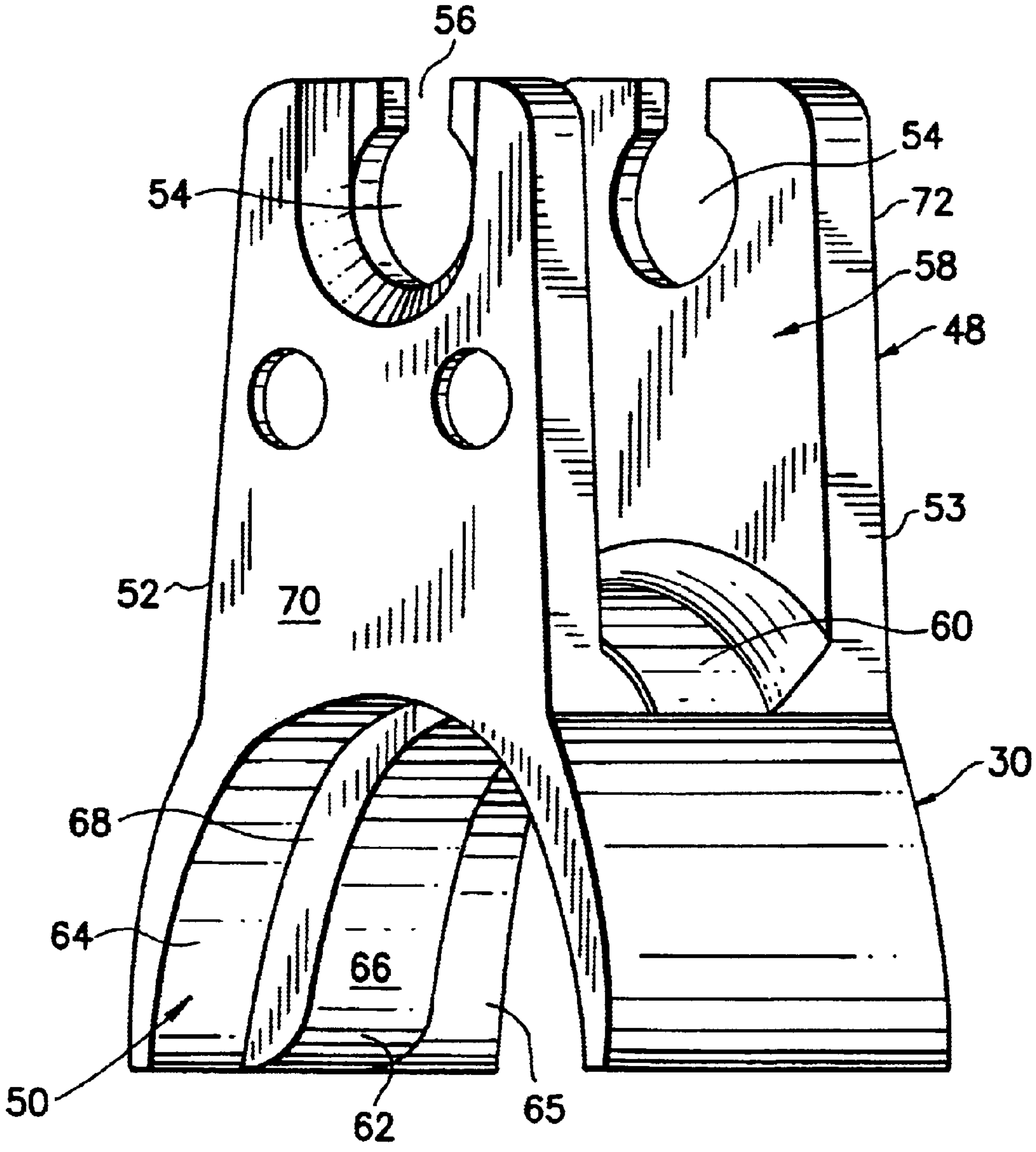
FIGS. 2A and 2B are perspective views of one of the crimping dies shown in FIG. 1.
Figure 2B:
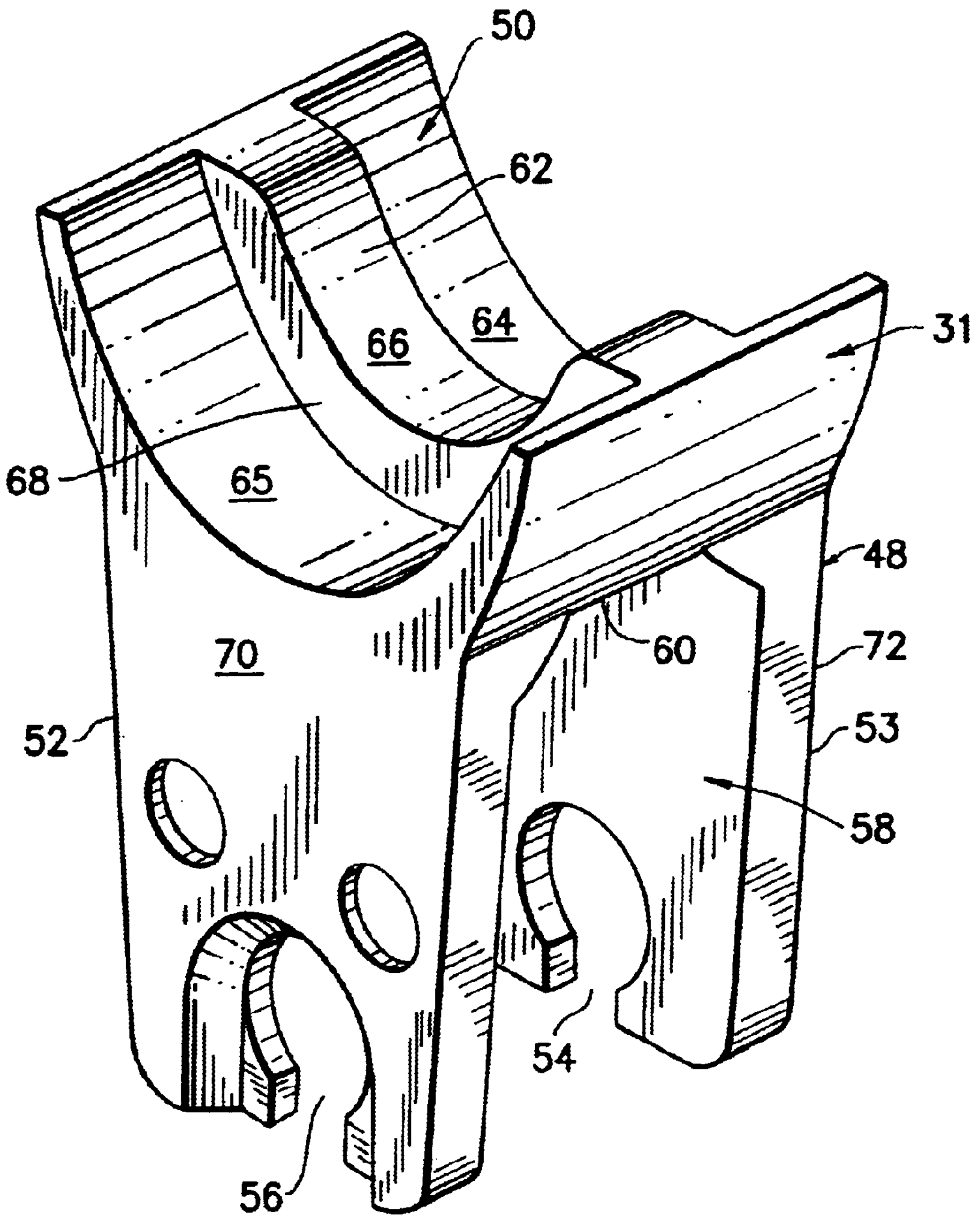
Figure 2C:
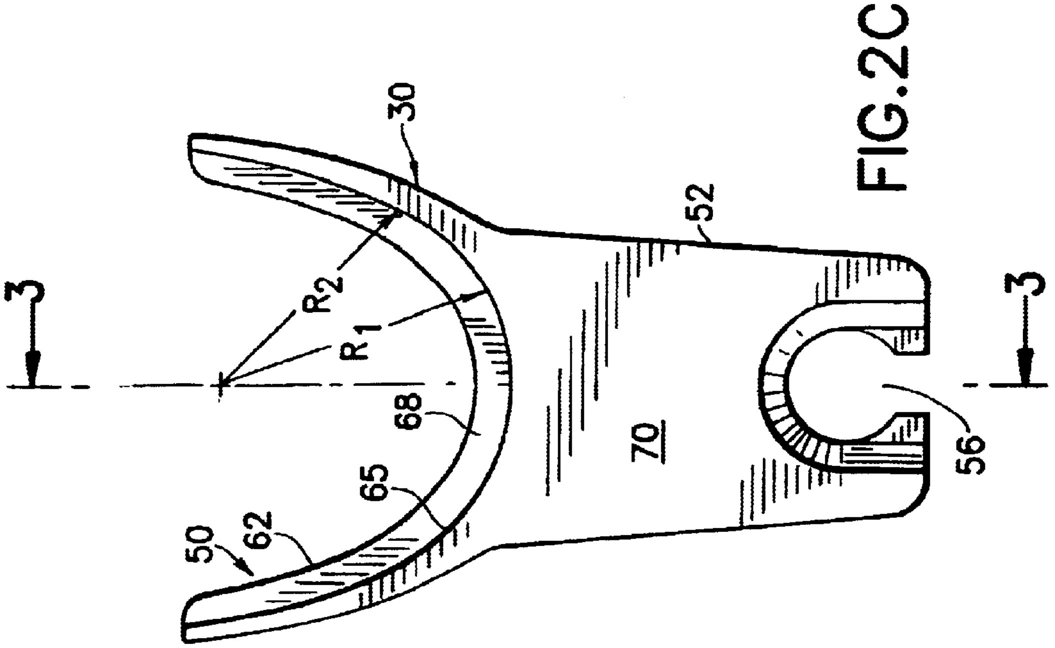
FIG. 2C is an elevational side view of the crimping die shown in FIG. 2A.
Figure 4:
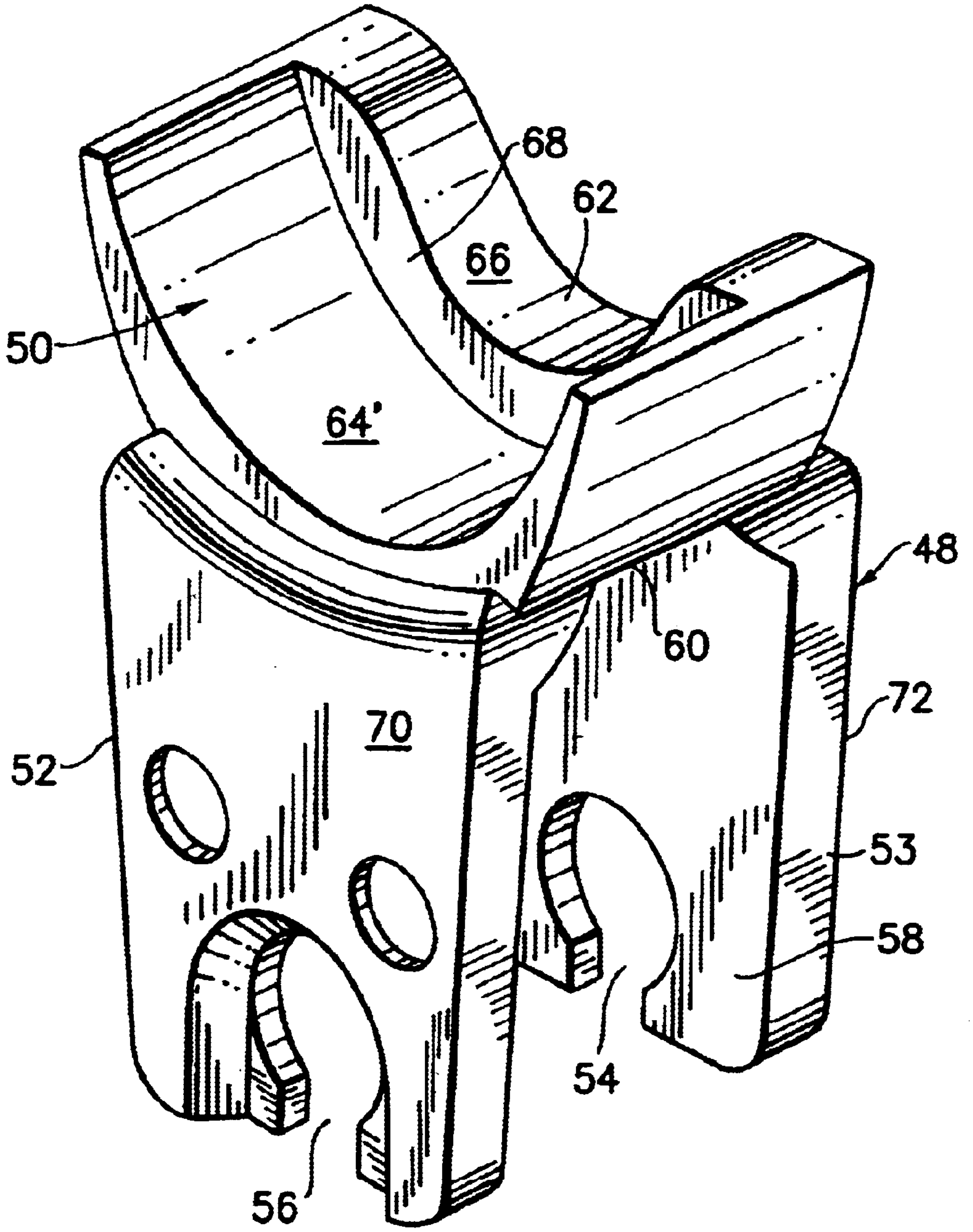
FIG. 4 is a perspective view of an alternative embodiment of one of the crimping dies shown in FIG. 1.

In the preferred embodiment the general radius of curvature $R_2$ is slightly larger than the radius of curvature of the outside surface 43 of the barrel section 42 of, for example, the connector 44. Generally it is from about 0.1 to about 0.2 inch larger measured along the axis 3—3 in FIG. 2C. The radii of curvature $R_1$ and $R_2$ can extend from the same center as shown in FIG. 2C or they can extend from separate centers (not shown) displaced from one another along the axis 3—3 in FIG. 2C.

The surfaces 64, 65 are located below or recessed from the surface 66 at the center of the die 30, 31 by a height $X_1$. In a preferred embodiment the distance $X_1$ is from about 0.1 to about 0.2 inch. However, any suitable height could be provided. In a preferred embodiment the surfaces 64, 65 have a width $W_2$ of from about 0.2 to about 0.4 inch and extend to the lateral sides 70, 72 of the dies. The width of the surface 64' would be about double that of the surfaces, namely, from about 0.4 to about 0.8 inch. However, any suitable width of the surfaces 64, 65, 64' and any desired transition from the surfaces 64, 65 to the lateral sides 70, 72 of the die 30, 31 could be provided. Because of the two different radii of curvatures $R_1$ and $R_2$ and the shape of the surfaces 64, 65, 66 the crimp projection 62 has a generally parabolic or "U" shaped side profile as seen best in FIG. 2C. Because $R_1$ is less than $R_2$ the height of the crimp projection 62 at the bottom of the "U" comprises the difference between $R_1$ and $R_2$.

The dies 30, 31 provide a general stepped progression between deformation of the connector 44 by the crimp projection 62 and subsequent pre-crimping by the surfaces 64,65. This occurs by providing a substantial increase in resistance to further deformation when the pre-crimp surfaces 64, 65, 64' initially contact the connector 44. The pre-crimped surface is created by means of the stepped die 30, 31 profile just described. The crimp projection 62 is either centered with respect to the centerline of the die set 30, 31 or offset to one side as in FIG. 4, depending on the amount of pre-crimping required, which intern depends on the connector. In the exemplary embodiment, the pre-crimping surface 64, 65 64'profile generally corresponds to the crimping surface 66 profile except that the crimping surface is raised from the pre-crimp surfaces 64, 65 64' by the height $X_1$. This allows for ease of fabrication.

Figure 5A:
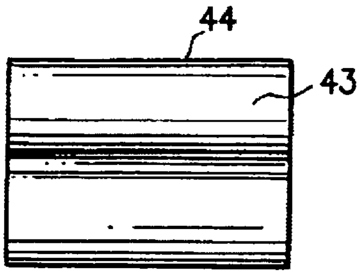
FIG.5A PRIOR ART
FIG. 5A is a side view of a prior art extruded "H" type connector.
Figure 5B:
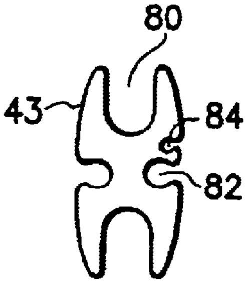
FIG.5B PRIOR ART
FIG. 5B is a front view of a prior art extruded "H" type connector.

Referring now to FIGS. 5A, 5B and 6–8 as well, the nature of an exemplary crimped connector will be illustrated. FIGS. 5A and 5B show an example of a typical prior art "H" type connector 44. This invention is not limited to this particular connector 44 but can be applied to any desired connector which is to be multiply crimped and which is subject to flaring out type deformation during the first or intermediate crimps. It can also be applied to connectors which are not subject to this type of deformation if desired. The connector 44 shown, is adapted to connect up to five conductors 46 together, two large diameter conductors 46 in slots, two medium diameter conductors 46' in slots 82 and one small diameter conductor 46" in slot 84. The connector 44 may have any desired number of slots.

Figure 6:
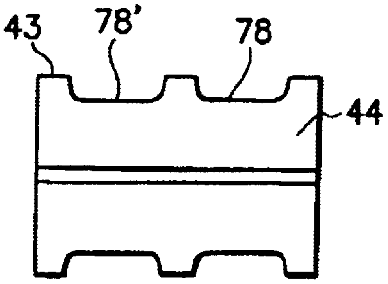
FIG.6 PRIOR ART
FIG. 6 is a side view of the "H" type connector of FIGS. 5A and 5B after crimping with a prior art two groove die set using a high tonnage tool.
Figure 7:
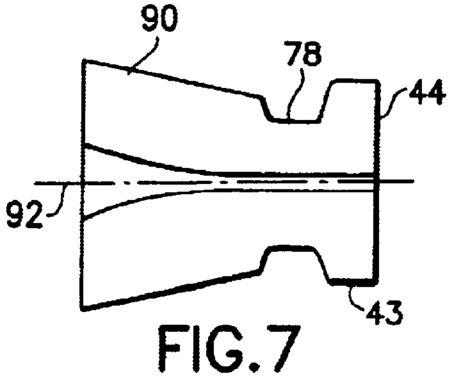
FIG. 7 is a side view of the "H" type connector of FIGS. 5A and 5B after crimping with a single groove die using a low tonnage tool without the pre-crimping in accordance with this invention.

With a high tonnage crimping tool it is possible to provide multiple crimps 78 in a connector 44 in a single crimping operation as shown in FIG. 6. This invention has been designed to produce a crimp design like that in FIG. 6 which can be produced by conventional 12 Short Ton tools, but using a circumferential "W" die profile in a 6–7 Short Ton tool or other low tonnage tool 10. Thus, as described above, the actual crimp width of the crimp projection 62 is less than the conventional crimp width.

Problems occur when using a die with a reduced connector crimp profile width to crimp the "H" style connectors and other connectors. When crimping an "H" style connector 44 with a die having a thinner crimp profile, the end portion 90 of the connector, which is not crimped extrudes slightly outward and flares outwardly above and below the axis 92 of the connector as in FIG. 7. This occurs because the connector 44 is relatively soft and deforms easily. The result of this phenomenon is that it becomes nearly impossible to position the connector 44 in the tool for a second crimp 78'.

This occurs either because the uncrimped portion 90 of the connector has grown to the point where it cannot fit between the crimp dies in the tool 10 or, if it can fit into the crimp dies, it slides away from the dies as soon as force is applied to the connector 44 due to the sloped or flared surface 90 of the deformed connector.

In order to overcome this problem, the pre-crimp surfaces 64, 65, 64' were added to the dies 30, 31. The pre-crimping surfaces 64, 65, 64' provide a "flat" 76 (a relatively straight surface in the longitudinal sense of the connector), as in FIG. 8, on the remainder, or a portion 90, of the uncrimped connector 44 surface 43. Since creating this additional compressed surface or pre-crimp 76 requires additional force from the tool 10, it is preferred that this pre-crimping take place when the tool has reached approximately 90 to 95% of it's total stroke or output force. the primary crimp is still within specification because approximately 90–95% of the available tonnage has gone into the primary crimp 78 and only approximately 5–10% has gone into the pre-crimp 76. The Pre-crimp 76 is essentially a flat dimple on the remaining connector surface 90. The intention is to provide just enough of a flat surface 76 for the crimp projection 62 to grab onto the connector 44 during the second crimp. The pre-crimp 76 allows engagement between the crimp projection 62 and the connector 44 so that the connector does not slide out of the die surface 66 during the second crimping.

The pre-crimp surfaces 64, 65, 64' provide a large contact area with the connector 44. The pre-crimp surfaces 64, 65, 64' permit a low tonnage tool 10 to reach full output force with pre-crimping. It is usually necessary to crimp the connector barrel two times onto the conductor(s) to form a connection with adequate pull-out resistance. With the dies 30, 31, it is possible to crimp even three or more times, but the user can use a low tonnage tool which is more easily handled than a 12 short ton tool.

In order to maximize the transition and minimize the pre-crimping with the limited amount of surface area available, the present invention provides the surfaces 64, 65, 64' with a slightly smaller general radius of curvature as compared to the barrel section 42 of the connector 44. The tool 10 is preferably a conventional tool and the amount of space between the ram 20 and the opposite portion 32 is limited, such as only about 0.60 inch for $Y_1$ and 1.52 inch for $Y_2$ (see FIG. 1). Thus, the dies 30, 31 of the present invention have been specifically designed to connect to the tool 10 in the limited space between the ram 20 and the opposite portion 32, but still allow circumferential crimping of a connector 44 on the conductors 46, 46', 46". Thus, the dies 30, 31 maximize use of the space between the ram 20 and opposite portion 32 through the unique design of the second section 50. In addition, the unique design of the second section maximizes support for the second section 50 on the D3 grooves 34 and 38 to prevent the second section 50 from being bent during repeated use.

In the past, larger output capacity hydraulic crimp tools have been used to crimp connectors/conductors. Tools such as the Y750 HYPRESS.TM. series and BAT35 BATOOL.TM. series. Traditionally the circumferential dies are nonbutting and have sufficient crimp area so that the tool die holders or die sets never contact each other when crimping. The resulting crimp dimension is highly dependent on the output force of the tool and contact area of the die. When the tool reaches full output force, a valve (not shown) internal to the hydraulic tool 10 relieves pressure and output force, thus establishing the crimp dimension.

As described above by reference to the embodiments of the invention, the electrical connector crimping die 30, 31 comprise a first section 48 for removably connecting the die to an electrical connector compression tool 10. A second section 50 of the die 30, 31, which is connected to the first section 48, is provided for crimping a connector 44. The second section 50 comprises a generally concave crimp projection 62 of a given height which defines a primary crimp surface 66 and at least one concave shaped secondary pre-crimp surface 64, 65, 64'. The secondary pre-crimp surface 64, 65, 64' is recessed relative to the primary crimp surface 66 by the given height. The primary crimp surface 66 and the secondary pre-crimp surface 64, 65, 64' are arranged relative to the first section 48 so that a major portion of a crimping force applied by the compression tool 10 to the crimping die 30, 31 is applied to the primary crimp surface 66 to crimp a first portion 78 of the connector 44 and so that a minor portion of the crimping force is applied to the secondary pre-crimp surface 64, 65, 64' to pre-crimp a second portion 78' of the connector 44.

A third pre-crimp surface 65 may be located on an opposite side of the crimp projection 62 from the second pre-crimp surface 64 so that a minor portion of the crimping force is applied to the third pre-crimp surface to pre-crimp a third portion of the connector.

In accordance with yet another embodiment of the invention a method is provided for crimping an electrical connector 44 onto at least two electrical conductors 46. The method comprises providing a hydraulic compression crimping tool 10 having a connector crimping die 30, 31. The connector crimping die 30 is connected to a hydraulic drive section 16 of the crimping tool 10 for movement by the drive section 16 towards a cooperating crimping die 31. The connector crimping die 30 and the cooperating crimping die 31 have a first section 50 for crimping the connector 44. The first section 50 comprises a generally concave crimp projection 62 of a given height which defines a first primary crimp surface 66 and at least one concave shaped second pre-crimp surface 64, 65, 64'. The second pre-crimp surface 64, 65, 64' is recessed relative to the primary crimp surface 66 by said given height. The process further comprises compressing the crimping dies 30, 31 against the electrical connector with the crimping projection 62 deforming the electrical connector to provide a full crimp 78 and the pre-crimp surface 64, 65, 64' subsequently contacting the electrical connector 44 to provide a pre-crimp(s) 78'. The method can further comprise, compressing the crimping die 30, 31*a* second time against the electrical connector 44 with the crimping projection 62 deforming the pre crimp 76 of the electrical connector to provide a second full crimp 78'.

While the present invention has been described in connection with the preferred embodiments of the various figures, it is to be understood that other similar embodiments may be used or modifications and additions may be made to the described embodiment for performing the same function of the present invention without deviating therefrom. Further, the arrangements described can be used with respect to components other than connectors, that comprise housings formed of insulative materials which carry elements to be fused onto a PWB or other electrical substrate. Therefore, the present invention should not be limited to any single embodiment, but rather construed in breadth and scope in accordance with the recitation of the appended claims.

What is claimed is:

1. An electrical connector crimping die comprising:

a first section for removably connecting the die to an electrical connector compression tool; and a second section connected to the first section for crimping a connector, the second section comprising a generally concave crimp projection of a given height which defines a primary crimp surface and at least one concave shaped secondary pre-crimp surface, the secondary pre-crimp surface being recessed relative to the primary crimp surface by said given height, and wherein the primary crimp surface and the secondary pre-crimp surface are arranged relative to the first section so that about 90 percent or more of a crimping force applied by the compression tool to said crimping die is applied to the primary crimp surface to crimp a first portion of the connector and so that a remaining percentage of the crimping force is applied to the secondary pre-crimp surface to pre-crimp a second portion of the connector.

2. A crimping die as in claim 1 wherein the second section comprises a third pre-crimp surface located on an opposite side of the crimp projection from the second pre-crimp surface so that the remaining percentage of the crimping force is applied to the third pre-crimp surface to pre-crimp a third portion of the connector as well as the second pre-crimp surface.

3. A crimping die as in claim 1 wherein the primary crimp surface comprises a curved shape.

4. A crimping die as in claim 3 wherein the secondary pre-crimp surface comprises a curved shape.

5. A crimping die as in claim 4 wherein a third pre-crimp surface comprises a curved shape.

6. A crimping die as in claim 4 wherein a general radius of curvature of the primary crimp surface is less than a general radius of curvature of the secondary pre-crimp surface by the given height.

7. A crimping die as in claim 5 wherein a general radius of curvature of the primary crimp surface is less than a general radius of curvature of the secondary pre-crimp surface or the third pre-crimp surface by the given height.

8. An electrical connector crimping die as in claim 1 wherein the primary crimp surface has a first radius of curvature, and wherein the secondary pre-crimp surface has a second different radius of curvature.

9. An electrical connector hydraulic crimping tool for crimping an electrical connector onto a conductor, the crimping tool comprising:

a hydraulic drive section generally adapted to provide a hydraulic crimping force to an electrical connector crimping die; and the connector crimping die comprising: a first section for connecting the die to the drive section of the crimping tool for movement by the drive section towards a cooperating crimping die; and a second section connected to the first section for crimping the connector, the second section comprising a generally concave crimp projection of a given height which defines a primary crimp surface and at least one concave shaped secondary pre-crimp surface, the secondary pre-crimp surface being recessed relative to the primary crimp surface by said given height, and wherein the primary crimp surface and the secondary pre-crimp surface are arranged relative to the first section so that about 90–95 percent of a crimping force applied by the hydraulic drive section to the connector crimping die is applied to the primary crimp surface to crimp a first portion of the connector and so that a about 5–10 percent of the crimping force is applied to the secondary pre-crimp surface to pre-crimp a second portion of the connector.

10. A crimping tool as in claim 9 wherein the first section of the connector crimping die is removably connected to the hydraulic drive section of the crimping tool.

11. A crimping tool as in claim 9 wherein the second section comprises a third pre-crimp surface located on an opposite side of the crimp projection from the second pre-crimp surface so that the crimping force is applied to the third pre-crimp surface to pre-crimp a third portion of the connector.

12. A crimping tool as in claim 9 wherein the primary crimp surface comprises a curved shape.

13. A crimping tool as in claim 12 wherein the secondary pre-crimp surface comprises a curved shape.

14. A crimping tool as in claim 12 wherein a third pre-crimp surface comprises a curved shape.

15. A crimping tool as in claim 13 wherein a general radius of curvature of the primary crimp surface is less than a general radius of curvature of the secondary pre-crimp surface by the given height.

16. A crimping die as in claim 14 wherein a general radius of curvature of the primary crimp surface is less than a general radius of curvature of the secondary pre-crimp surface or the third pre-crimp surface by the given height.

17. An electrical connector crimping die comprising:

a first section for removably connecting the die to an electrical connector compression tool; and a second section connected to the first section for crimping a connector onto a conductor, the second section comprising a generally concave crimp projection which defines a primary crimp surface and at least one concave shaped secondary pre-crimp surface, wherein the secondary pre-crimp surface is recessed relative to the primary crimp surface, wherein the primary crimp surface is adapted to crimp the connector onto the conductor to form a first crimp, wherein the secondary pre-crimp surface is adapted to form a cross sectional substantially flat pre-crimp surface on the connector adjacent the first crimp as a pre-crimp compression of the connector while the primary crimp surface forms the first crimp, and wherein the crimp projection is adapted to be subsequently moved onto the cross sectional flat pre-crimp surface for forming a second crimp at the pre-crimp surface without the crimp projection and connector sliding relative to each other during forming of the second crimp.

18. An electrical connector crimping die as in claim 17 wherein the primary crimp surface has a first radius of curvature which is smaller than a radius of curvature of the secondary pre-crimp surface.

19. An electrical connector crimping die as in claim 17 wherein the primary crimp surface is adapted to apply about 90–95 percent of a crimping force applied by a compression tool to the connector and the secondary pre-crimp surface is adapted to apply a remainder force of about 5–10 percent of the crimping force to the connector.

20. An electrical connector crimping die as in claim 19 wherein the at least one concave shaped secondary pre-crimp surface comprises two pre-crimp surfaces located on opposite sides of the crimp projection, wherein both of the two pre-crimp surfaces are adapted to apply the remainder force to the connector.

* * * * *